Patented Oct. 5, 1954

2,691,025

UNITED STATES PATENT OFFICE 2,691,025

N - (TERTIARY-AMINOALKYL) - 2,4 - DISUB-
STITUTED - BENZAMIDES AND THEIR
PREPARATION

Raymond O. Clinton, North Greenbush, and Stanley C. Laskowski, Menands, N. Y., assignors to Sterling Drug Inc., New York, N. Y., a corporation of Delaware No Drawing. Application March 30, 1951,
Serial No. 218,532

19 Claims. (Cl. 260—294)

This invention relates to N-(tertiary-aminoalkyl)-2,4-di-substituted benzamides, to their acid addition and quaternary salts, and to the preparation of these classes of substances.

The basic amides of our invention have the general formula

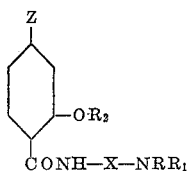

where Z is a member of the group consisting of NO₂, NH₂ and NHR₃, R₃ being a lower alkyl radical, R₂ is a member of the group consisting of H and lower alkyl radicals, X is a lower alkylene radical and NRR₁ is a lower aliphatic-like tertiary-amino radical. These compounds have useful anesthetic and other pharmacological properties, and they are also useful for the preparation of other compounds with useful pharmacological properties.

In the above general formula, the lower alkyl radicals represented by R₂ and R₃ have preferably 1–6 carbon atoms, including such examples as methyl, ethyl, n-propyl, isobutyl, 2-butyl, 3-amyl, n-hexyl, and the like. The lower alkylene radical designated hereinabove as X has preferably 2–4 carbon atoms and has its two free valence bonds on different carbon atoms. Thus, X includes such examples as —CH₂CH₂—,

—CH₂CH₂CH₂—, —CH₂CH(CH₃)—,
—CH₂CH₂CH₂CH₂—, —CH₂CH(CH₃)CH₂—, and the like. The lower aliphatic-like tertiary-amino radical shown above as NRR₁ comprehends lower dialkylamino radicals where R and R₁ are lower alkyl groups, alike or different, and each alkyl group having preferably 1–6 carbon atoms, such dialkylamino radicals including dimethylamino, diethylamino, ethylmethylamino, diisopropylamino, di-n-butylamino, di-n-hexylamino, and the like. Further, the lower aliphatic-like tertiary-amino radical designated as NRR₁ encompasses those radicals where R and R₁ are joined directly or through an oxygen atom to form saturated N-heteromonocyclic radicals having 5–6 ring atoms, illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

The amides of our invention are conveniently prepared from the 4-nitro-2-substituted-benzoic acids as illustrated by the following series of reactions wherein X, R, R₁, R₂ and R₃ have the meanings given hereinabove:

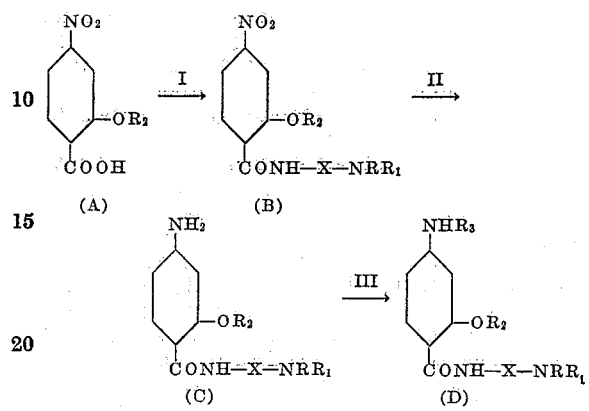

Thus, in step I, a 4-nitro-2-substituted-benzoic acid (A) is converted into an N-(tertiary-aminoalkyl) - 4 - nitro - 2 - substituted - benzamide (B), which, in step II, is reduced to yield the corresponding N-(tertiary-aminoalkyl)-4-amino-2-substituted-benzamide (C). In step III, the 4-amino compound (C) is alkylated to produce the N - (tertiary - aminoalkyl) - 4 - alkylamino-2-substituted-benzamide (D). The intermediate 4-nitro-2-alkoxybenzoic acids (designated above as (A) where R₂ is alkyl) and their lower alkyl esters are disclosed but not claimed in our co-pending U. S. Patent Applications Serial Nos. 168,843 and 168,844 (now U. S. Patent 2,657,209), filed June 17, 1950. The N-(tertiary-aminoalkyl)-4-nitro-2-substituted-benzamides (designated above as (B)) are disclosed and claimed in our continuation-in-part U. S. Patent Application Serial No. 356,594, filed May 21, 1953.

A specific illustration of the foregoing series of reactions when R₂ is H is the formation of N - [3 - (1 - piperidyl)propyl] - 4 - n - butylamino-2-hydroxybenzamide by converting 4-nitro-2-hydroxybenzoic acid into N-[3-(1-piperidyl)propyl]-4-nitro-2-hydroxybenzamide, reducing this nitro compound to form the corresponding N-[3-(1-piperidyl)propyl]-4-amino-2-hydroxybenzamide and alkylating this basic 4-amino amide. In practicing our invention we carried out step I when R₂ was H by preferably first converting 4-nitro-2-hydroxybenzoic acid into its lower alkyl ester, e. g., methyl ester, and then treating the lower alkyl ester with a tertiary-aminoalkylamine having the formula

H₂N—X—NRR₁

A specific illustration of the above series of reactions when R₂ is a lower alkyl radical is the formation of N-(2-diethylaminoethyl) 4-n-amylamino-2-ethoxybenzamide by converting 4-nitro-2-ethoxybenzoic acid into N-(2-diethylaminoethyl)-4-nitro-2-ethoxybenzamide which is reduced to yield N-(2-diethylaminoethyl) 4-amino-2-ethoxybenzamide and alkylating the resulting 4-amino amide. Step I where R₂ is a lower alkyl radical is preferably carried out by converting the 4-nitro-2-alkoxybenzoic acid into its corresponding acid halide by treating with an appropriate halogenating agent such as thionyl chloride and treating the resulting acid halide with a tertiary-aminoalkylamine having the formula H₂N—X—NRR₁.

The reduction of the N-(tertiary-aminoalkyl)-4-nitro-2-substituted-benzamides (B) to the corresponding 4-amino amides (C) was carried out both by chemical methods and by catalytic hydrogenation. Suitable chemical reducing agents include iron and hydrochloric acid, ferrous sulfate and ammonia, tin and hydrochloric acid, sodium hydrosulfite, etc. Catalysts suitable when catalytic hydrogenation is used include Raney nickel, platinum, palladium, or other catalysts generally effective to catalyze hydrogenation of nitro groups to amino groups.

The alkylation of the 4-amino amides (C) to produce the related N-(tertiary-aminoalkyl)-4-alkylamino-2-substituted-benzamides (D) was preferably carried out by reductively alkylating with an alkanal. An illustration is the formation of N-[2-(2-methyl-1-pyrrolidyl)ethyl]-4-n-propylamino-2-hydroxybenzamide by treating a mixture of the corresponding 4-amino amide and propionaldehyde with chemical reducing agents, such as zinc dust and acetic acid, iron and acetic acid, or with hydrogen under pressure using catalysts such as platinum, palladium, Raney nickel, or other catalysts generally effective in reductive alkylations using aliphatic aldehydes.

Another style of synthesis of the 4-alkylamino amides (D) is the direct alkylation of the 4-amino amides (C) with alkylating agents such as methyl sulfate, methyl iodide, ethyl chloride, n-propyl bromide, isobutyl iodide, and the like, in the presence of a acid acceptor, e. g. sodium bicarbonate, potassium carbonate, etc.

Our invention includes, also, salts of the basic amides described above. Such salts include non-toxic acid addition salts and quaternary ammonium salts, which are readily prepared from the basic amides. Acid addition salts are formed by reacting the basic amides with an acid such as hydrochloric acid, hydrobromic acid, hydriodic acid, sulfuric acid, phosphoric acid, sulfamic acid, acetic acid, lactic acid, citric acid, tartaric acid, ethanesulfonic acid, etc., to yield, respectively, the hydrochlorides, hydrobromides, hydriodides, sulfates, phosphates, sulfamates, acetates, lactates, citrates, tartrates, ethanesulfonates, etc. Our quaternary ammonium salts where Z is NO₂ are prepared by treating the N-(tertiary-aminoalkyl)-4-nitro-2-hydroxy (or alkoxy) benzamides (B) with lower alkyl and aralkyl esters of strong inorganic acids and organic sulfonic acids, such as methyl chloride, methyl bromide, methyl iodide, ethyl bromide, ethyl iodide, propyl bromide, propyl iodide, benzyl chloride, benzyl bromide, methyl sulfate, ethyl sulfate, methyl benzenesulfonate, methyl p-toluenesulfonate, etc. yielding, respectively, the methochlorides, methobromides, methiodides, ethobromides, ethiodides, propobromides, propiodides, benzochlorides, benzobromides, methosulfates, ethosulfates, methobenzenesulfonates, metho - p - toluenesulfonates, etc. The corresponding N-(tertiary-aminoalkyl)-4-amino-2-hydroxy (or alkoxy) benzamide quaternary ammonium salts are prepared by catalytic hydrogenation of these corresponding 4-nitrobenzamide quaternary ammonium salts. Alkylation of the 4-amino compounds yield the corresponding N - (tertiary - amino - alkyl) - 4 - alkylamino-2-hydroxy (or alkoxy) benzamide quaternary ammonium salts.

The following examples further illustrate our invention, but should not be construed as a limitation thereto.

EXAMPLE 1

*N - (2 - diethylaminoethyl) - 4 - nitro - 2 - hydroxybenzamine*

A solution of 16.7 g. of ethyl 4-nitro-2-hydroxybenzoate and 23.2 g. of 2-diethylaminoethylamine in 250 cc. of dry toluene was refluxed for eight hours. On cooling, the reaction mixture separated into two layers, the desired product being in the deep orange-colored lower layer, which solidified when rubbed. After the toluene had been removed by distilling under reduced pressure, the orange solid that remained was dissolved in a minimum quantity of hot absolute ethanol. The solution was diluted with n-pentane, cooled, and filtered. The solid was recrystallized from absolute ethanol-n-pentane, yielding the desired product, N-(2-diethylaminoethyl)-4-nitro-2-hydroxybenzamide.

This basic amide was converted into its hydrochloride salt by dissolving it in an excess of warm ethanol saturated with hydrogen chloride gas, warming the mixture to complete dissolution, cooling the solution and diluting it with absolute ether. Two recrystallizations of this yellow solid from absolute ethanol-absolute ether yielded N-(2-diethylaminoethyl)-4-nitro-2-hydroxybenzamide hydrochloride, M. P. 149.6–150.2° C. (cor.).

*Anal.*—Calcd. for $C_{13}H_{19}N_3O_4 \cdot HCl$: C, 49.13; H, 6.34; Cl, 11.16. Found: C, 49.35; H, 6.10; Cl, 11.12.

Additional N-(tertiary-aminoalkyl)-4-nitro-2-hydroxybenzamides which can be prepared according to the foregoing procedure by substituting the appropriate tertiary-aminoalkylamine for 2-diethylaminoethylamine include the following: N-(2-dimethylamino-1-propyl)-4-nitro-2-hydroxybenzamide; N-(2-di-n-butylaminoethyl)-4-nitro-2-hydroxybenzamide; N-[3-(1-piperidyl)-propyl]-4-nitro-2-hydroxybenzamide; N-[2-(2-methyl-1-piperidyl)ethyl]-4-nitro-2-hydroxybenzamide; N-[3-(1-pyrrolidyl)propyl]-4-nitro-2-hydroxybenzamide; N-[2-(2,5-dimethyl-1-pyrrolidyl)ethyl]-4-nitro-2-hydroxybenzamide; and N-[3-(4-morpholinyl)propyl]-4-nitro-2-hydroxybenzamide.

EXAMPLE 2

*N - (3 - diethylaminopropyl) - 4 - nitro - 2 - hydroxybenzamide*

This preparation was carried out according to the procedure described above for Example 1, but using 16.7 g. of ethyl 4-nitro-2-hydroxybenzoate; 13.0 g. of 3-diethylaminopropylamine and 250 cc. of dry toluene. The product thus obtained was N-(3-diethylaminopropyl)-4-nitro-2-hydroxybenzamide, which in the form of its hydrochloride, melted at 137.8–138.8° C. after recrystallization from isopropanol.

Anal.—Calcd. for $C_{14}H_{21}N_3O_4 \cdot HCl$: C, 50.67; H, 6.68; N, 12.66. Found: C, 50.72; H, 6.50; N, 12.52.

EXAMPLE 3

N - (4' - diethylaminobutyl) - 4 - nitro - 2 - hydroxybenzamide

When the procedure described above for Example 1 is followed, but using 39.4 g. of methyl 4-nitro-2-hydroxybenzoate, 43.2 g. of 4-diethylaminobutylamine and 500 cc. of dry toluene, there was obtained N-(4-diethylaminobutyl)-4-nitro-2-hydroxybenzamide, which in the form of its hydrochloride melted at 146.0–146.9° C. when recrystallized from isopropanol.

Anal.—Calcd. for $C_{15}H_{23}N_3O_4 \cdot HCl$: C, 52.09; H, 7.00; Cl, 10.25. Found: C, 52.23; H, 6.70; Cl, 10.09.

EXAMPLE 4

N - (3 - diethylaminopropyl) - 4 - nitro - 2' - methoxybenzamide

A mixture of 42.2 g. of methyl 4-nitro-2-methoxybenzoate, 39.1 g. of 3-diethylaminopropylamine in 500 cc. of dry xylene was refluxed for sixteen hours. The xylene was distilled off under reduced pressure, the residual oil was dissolved in a small amount of ethyl acetate, the solution was cooled and diluted with n-hexane whereupon an oily material separated. The solvents were decanted from the brown oily base, N - (3 - diethylaminopropyl) - 4 - nitro - 2 - methoxybenzamide, which was converted into its hydrochloride by dissolving it in a small quantity of ethyl acetate and treating the resulting solution with an excess of ethereal hydrogen chloride whereupon there separated a brown oily material. The solvent was decanted and the oil was triturated with isopropanol and then diluted with absolute ether, yielding a semisolid, but filterable, product which was filtered and recrystallized twice from isopropanol. There was thus obtained, as yellow rosettes of needles, N - (3 - diethylaminopropyl) - 4 - nitro - 2 - methoxybenzamide hydrochloride, M. P. 149.1–150.0° C. (cor.).

Anal.—Calcd. for $C_{15}H_{23}N_3O_4 \cdot HCl$: C, 52.09; H, 7.00; Cl, 10.25. Found: C, 52.16; H, 6.88; Cl, 10.33.

Additional N-(tertiary-aminoalkyl)-4-nitro-2-alkoxybenzamides which can be prepared according to the above procedure using the appropriate lower alkyl 4-nitro-2-alkoxybenzoate and tertiary-aminoalkylamine in place of methyl 4-nitro-2-methoxybenzoate and 3-diethylaminopropylamine, respectively, include the following: N-(2-dimethylamino -1 - propyl)-4-nitro-2-methoxybenzamide; N-(2-di-n-butylaminoethyl)-4-nitro-2-methoxybenzamide; N-[3-(1-piperidyl)propyl]-4-nitro-2-ethoxybenzamide; and N-[3-(2-methyl-1-piperidyl)propyl]-4-nitro-2-methoxybenzamide.

EXAMPLE 5

N-(2-diethylaminoethyl)-4-nitro-2-methoxybenzamide hydrochloride

A mixture of 80.0 g. of 4-nitro-2-methoxybenzoic acid and 242 g. of thionyl chloride was refluxed for two hours and the excess thionyl chloride was removed by distilling in vacuo. The residue was taken up in dry benzene and the benzene was removed by distilling in vacuo and the remaining oily material was dried in a vacuum desiccator over phosphorus pentoxide. This material, thus obtained, was 4-nitro-2-methoxybenzoyl chloride.

A solution of 40 g. of 4-nitro-2-methoxybenzoyl chloride, 21.6 g. of 2-diethylaminoethylamine and 300 cc. of dry benzene was warmed, whereupon there separated a gummy material, which was triturated with warming until solidification resulted. The mixture was cooled in an icebath and diluted to a total volume of about one liter with benzene. The solid was filtered and recrystallized from absolute ethanol-n-hexane, using decolorizing charcoal, yielding N-(2-diethylaminoethyl)-4-nitro-2-methoxybenzamide hydrochloride, M. P. 161.2–162.7° C. (cor.).

Anal.—Calcd. for $C_{14}H_{21}N_3O_4 \cdot HCl$: N, 4.22; Cl, 10.69. Found: N, 4.14; Cl, 10.49.

Additional N-(tertiary-aminoalkyl)-4-nitro-2-alkoxy benzamide hydrochlorides which can be prepared according to the above procedure by substituting the appropriate 4-nitro-2-alkoxybenzoic acid and tertiary-aminoalkylamine for 4-nitro-2-methoxybenzoic acid and 2-diethylaminoethylamine, respectively, include the following: N-[2-(2-methyl-1-piperidyl)ethyl]-4-nitro-2-ethoxybenzamide hydrochloride; N-[3-(1-pyrrolidyl)propyl]-4-nitro-2-ethoxybenzamide hydrochloride; N-[2-(2,5-dimethyl-1-pyrrolidyl)-ethyl]-4-nitro-2-methoxybenzamide hydrochloride; and N-[3-(4-morpholinyl)propyl]-4-nitro-2-ethoxybenzamide hydrochloride.

EXAMPLE 6

N-(3-diethylamino-2-hydroxypropyl)-4-nitro-2-methoxybenzamide

A mixture of 19.3 g. of 3-diethylamino-2-hydroxypropylamine, 16.6 g. of sodium bicarbonate and 125 cc. of water was stirred until a clear solution resulted. To this solution was added with stirring 28.4 g. of 4-nitro-2-methoxybenzoyl chloride in 300 cc. of chloroform at room temperature over a period of thirty-five minutes. The resulting solution was then stirred for an additional one hour at room temperature, dried over anhydrous calcium sulfate and the solvent removed by distilling in vacuo. There was thus obtained, as a dark brown, viscous oil, N-(3-diethylamino - 2 - hydroxypropyl)-4-nitro-2-methoxybenzamide.

Treatment of this basic amide in absolute ethanol solution with an excess of ethanolic hydrogen chloride (20% by weight) yielded, as an oil, the corresponding hydrochloride. The mixture was diluted with n-hexane to ensure complete precipitation of this salt. The oil was separated from the solvents by decantation and then was dissolved in absolute ethanol. To the ethanol solution was added n-hexane to turbidity, whereupon the hydrochloride precipitated in crystalline form. The crystalline product was filtered and recrystallized twice from absolute ethanol, yielding N-(3-diethylamino-2-hydroxypropyl)-4-nitro-2-methoxybenzamide hydrochloride, M. P. 153.6–155.0° C. (cor.).

Anal.—Calcd. for $C_{15}H_{23}N_3O_5 \cdot HCl$: $N_{(NO_2)}$, 3.87; Cl, 9.80. Found: $N_{(NO_2)}$, 3.99; Cl, 9.62.

EXAMPLE 7

N-(2-diethylaminoethyl)-4-nitro-2-n-butoxybenzamide

To a mixture of 23.6 g. of 4-nitro-2-n-butoxybenzoic acid, 100 cc. of dry benzene and 9.48 g. of pyridine was added dropwise 9.53 g. of thionyl chloride dissolved in 100 cc. of dry benzene. The solution was then heated on a steam bath for ten minutes, yielding a solution of 4-nitro-2-n-butoxy-benzoyl chloride.

This solution was added slowly, with stirring, to a mixture of 100 cc. of water, 15.1 g. of sodium bicarbonate, 11.6 g. of 2-diethylaminoethylamine and 200 cc. of chloroform, and the resulting mixture was stirred for one hour. The chloroform and water layers were separated, the aqueous layer was washed with chloroform and the chloroform washings were added to the chloroform layer. The chloroform solution was then washed with water, 5% aqueous sodium hydroxide solution and water again, and then dried over anhydrous calcium sulfate. The chloroform was removed by distilling in vacuo, the remaining material was dissolved in 300 cc. of toluene and the toluene was removed by distilling in vacuo. The residue was then taken up in 300 cc. of benzene followed by removal of the benzene by distilling in vacuo, yielding a solid product. This solid material was recrystallized three times from n-heptane, yielding N-(2-diethylaminoethyl)-4-nitro- 2 -n-butoxybenzamide, M. P. 49.9–50.9° C. (cor.).

*Anal.*—Calcd. for $C_{17}H_{27}N_3O_4$: N, 12.45. Found: N, 12.32.

The basic amide was converted into its monohydrochloride by dissolving it in ethyl acetate and treating the resulting solution with an excess of hydrogen chloride dissolved in ether (20% by weight). Absolute ether was added to ensure complete precipitation of the hydrochloride, which separated as an oil. On cooling, the oily material gradually gummed and finally crystallized. Two recrystallizations of this material from absolute ethanol-n-hexane yielded N-(2-diethylaminoethyl)-4-nitro-2 - n - butoxybenzamide hydrochloride, M. P. 133.2–134.2° C. (cor.).

*Anal.*—Calcd. for $C_{17}H_{27}N_3O_4 \cdot HCl$: Cl, 9.48; $N_{(NO_2)}$, 3.74; N, 11.24. Found: Cl, 9.57; $N_{(NO_2)}$, 3.74; N, 11.33.

Additional N-(tertiary-aminoalkyl)-4-nitro-2-alkoxybenzamides which can be prepared according to the above procedure by substituting the appropriate 4-nitro-2-alkoxybenzoic acid and tertiary-aminoalkylamine for 4-nitro-2-n-butoxybenzoic acid and 2-diethylaminoethylamine, respectively, include the following: N-(2-dimethylamino-1-propyl)-4-nitro- 2 -n-amoxybenzamide; N-(2-di-n-butylaminoethyl)-4-nitro - 2 - n - propoxybenzamide; N-[3-(1-piperidyl)propyl]-4-nitro-2-n-butoxybenzamide; N-[2-(2-methyl-1-piperidyl)ethyl]-4-nitro-2-n-hexoxybenzamide; N-[3-(1-pyrrolidyl)propyl]-4-nitro - 2 - isobutoxybenzamide; N-[2-(2,5-dimethyl-1-pyrrolidyl)ethyl]-4-nitro-2-n-propoxybenzamide; and N-[3-(4-morpholinyl)propyl] - 4 - nitro-2-n-butoxybenzamide.

EXAMPLE 8

N-(2-diethylaminoethyl)-4-nitro-2-n-propoxybenzamide

When the procedure described above for Example 7 was followed but substituting 22.5 g. of 4-nitro-2-n-propoxybenzoic acid in place of the 4-nitro-2-n-butoxybenzoic acid, there was obtained N -(2 - diethylaminoethyl) - 4 - nitro - 2 - n-propoxybenzamide, M. P. 64.4–65.0° C. (cor.) when recrystallized from n-hexane.

*Anal.*—Calcd. for $C_{16}H_{25}N_3O_4$: N, 12.99. Found: N, 13.28.

Conversion of the basic amide to its monohydrochloride was accomplished by dissolving it in ethyl acetate and treating the resulting solution with an excess of hydrogen chloride in ether (20% by weight). The precipitated salt was recrystallized twice from absolute ethanol, yielding N - (2 - diethylaminoethyl) - 4 - nitro - 2 - n-propoxybenzamide hydrochloride, M. P. 164.8–167.9° C. (cor.).

*Anal.*—Calcd. for $C_{16}H_{25}N_3O_4 \cdot HCl$: Cl, 9.85; $N_{(NO_2)}$, 3.89. Found: Cl, 9.96; $N_{(NO_2)}$, 4.14.

EXAMPLE 9

N-(2-diethylaminoethyl)-4-nitro-2-n-butoxybenzamide methiodide

To a solution of N-(2-diethylaminoethyl)-4-nitro-2-n-butoxybenzamide in 75 cc. of ethyl acetate was added 10 cc. of methyl iodide and the resulting solution was allowed to stand at room temperature. The precipitated quaternary salt was recrystallized twice from absolute ethanol, yielding N - (2 - diethylaminoethyl) - 4 - nitro-2-n-butoxybenzamide methiodide, M. P. 136.5–137.6° C. (cor.).

*Anal.*—Calcd. for $C_{17}H_{27}N_3O_4 \cdot CH_3I$: $N_{(NO_2)}$, 2.92; I, 26.48. Found: $N_{(NO_2)}$, 3.09; I, 26.40.

Additional N - (tertiary - aminoalkyl) - 4-nitro-2-alkoxybenzamide quaternary salts which can be prepared according to the foregoing procedure by substituting the appropriate basic amide and an alkyl or aralkyl ester of a strong inorganic acid or an organic sulfonic acid for N-(2 - diethylaminoethyl) - 4 - nitro - 2 - n-butoxybenzamide and methyl iodide, respectively, include the following: N-(2-dimethylamino-1-propyl) - 4 - nitro - 2 - n - amoxybenzamide methiodide; N - (2 - di - n - butylaminoethyl)-4 - nitro - 2 - n - propoxybenzamide methobromide; N - [3 - (1 - piperidyl)propyl] - 4 - nitro-2 - n - butoxybenzamide ethiodide; N - [2 - (2-methyl - 1 - piperidyl)ethyl] - 4 - nitro - 2 - n-hexoxybenzamide benzobromide; N - [3 - (1-pyrrolidyl)propyl] - 4 - nitro - 2 - isobutoxybenzamide methosulfate; N - [2 - (2,5 - dimethyl - 1 - pyrrolidyl)ethyl] - 4 - nitro - 2-methoxybenzamide methobenzenesulfonate; and N - [3 - (4 - morpholinyl)propyl] - 4 - nitro - 2-ethoxybenzamide metho-p-toluenesulfonate.

Similarly, following the foregoing procedure but using the related N-(tertiary-aminoalkyl)-4 - nitro - 2 - hydroxybenzamides, as described in Example 1, the N - (tertiary - aminoalkyl) - 4-nitro-2-hydroxybenzamide quaternary salts are formed, for example, N-(2-diethylaminoethyl)-4 - nitro - 2 - hydroxybenzamide methiodide, N-(2 - di - n - butylaminoethyl) - 4 - nitro - 2-hydroxybenzamide ethobromide, N - [2 - (2-methyl - 1 - piperidyl)ethyl] - 4 - nitro - 2-hydroxybenzamide benzochloride, N - [3 - (4-morpholinyl)propyl] - 4 - nitro - 2 hydroxybenzamide methosulfate and N - [2 - (2,5 - dimethyl - 1 - pyrrolidyl)ethyl] - 4 - nitro - 2-hydroxybenzamide metho-p-toluenesulfonate.

EXAMPLE 10

N-(2-diethylaminoethyl)-4-nitro-2-n-propoxybenzamide methiodide

When the procedure described for Example 9 was followed but substituting 6.0 g. of N-(2-diethylaminoethyl) - 4 - nitro - 2 - n - propoxybenzamide for the corresponding 2-n-butoxybenzamide, there was obtained N - (2 - diethylaminoethyl) - 4 - nitro - 2 - n - propoxybenzamide methiodide, M. P. 169.8–170.5° C. (cor.).

*Anal.*—Calcd. for $C_{15}H_{25}N_3O_4 \cdot CH_3I$: $N_{(NO_2)}$, 3.01; I, 27.28. Found: $N_{(NO_2)}$, 3.05; I, 27.28.

EXAMPLE 11

*N-(3-diethylaminopropyl)-4-amino-2-hydroxybenzamide*

A stirred mixture of 56.5 g. of powdered iron (ferrum reductum), 400 cc. of ethanol, 100 cc. of water and 1 cc. of concentrated hydrochloric acid was brought to a boil. The source of heat was removed and 56 g. of N - (3 - diethylaminopropyl) - 4 - nitro - 2 - hydroxybenzamide hydrochloride was added portionwise, with stirring, at such a rate as to maintain gentle boiling. After all of the nitro compound had been added, the mixture was heated, with stirring, for an additional twenty-five minutes. An excess of sodium bicarbonate (about 50 g.) was added and stirring was continued for five minutes. The hot reaction mixture was filtered and the filtrate was concentrated under reduced pressure to remove the ethanol and as much water as possible. The residual material was treated with toluene, the insoluble inorganic salts were filtered off and the toluene was removed by distilling under reduced pressure, thereby yielding the basic amide, N - (3 - diethylaminopropyl) - 4 - amino - 2 - hydroxybenzamide, as a thick, oily material.

Treatment of the basic amide in a solution of anhydrous ethanol with an excess of ethereal hydrogen chloride, yields the corresponding dihydrochloride as a brown oil. The solvents were decanted and the residual brown oil was triturated with a small amount of absolute ethanol until solidification resulted. The mixture was diluted with acetone, the solid was filtered and recrystallized from absolute ethanol, using decolorizing charcoal and adding ethanolic hydrogen chloride to the filtrate. A second recrystallization in the same manner yielded, as fine white needles, N - (3 - diethylaminopropyl) - 4 - amino - 2 - hydroxybenzamide dihydrochloride, M. P. 179–182° C. (cor.).

*Anal.*—Calcd. for $C_{14}H_{23}N_3O_2 \cdot 2HCl$: C, 49.71; H, 7.45; Cl, 20.96. Found: C, 49.47; H, 7.27; Cl, 20.70.

Additional N - (tertiary - aminoalkyl) - 4 - amino - 2 - hydroxybenzamides which can be prepared according to the above procedure but substituting the appropriate N - (tertiary-aminoalkyl) - 4 - nitro - 2 - hydroxybenzamide hydrochloride for N - (3 - diethylaminopropyl) - 4-nitro-2-hydroxybenzamide hydrochloride, include the following: N - (2 - dimethylamino - 1 - propyl) - 4 - amino - 2 - hydroxybenzamide; N - (2 - di - n - butylaminoethyl) - 4 - amino - 2 - hydroxybenzamide; N - [3 - (1 - piperidyl)propyl] - 4 - amino - 2 - hydroxybenzamide; N-[2 - (2 - methyl - 1 - piperidyl)ethyl] - 4 - amino - 2 - hydroxybenzamide; N - [3 - (1-pyrrolidyl)propyl] - 4 - amino - 2 - hydroxybenzamide; N - [2 - (2,5 - dimethyl - 1 - pyrrolidyl)ethyl] - 4 - amino - 2 hydroxybenzamide; and N - [3 - (4 - morpholinyl)propyl] - 4-amino-2-hydroxybenzamide.

EXAMPLE 12

*N - (3 - diethylaminopropyl) - 4 - amino - 2 - methoxybenzamide*

To a mixture of 42.3 g. of powdered iron, 1 cc. of concentrated hydrochloric acid and 400 cc. of 50% aqueous ethanol was added portionwise with stirring 43.4 g. of N-(3-diethylaminopropyl)-4-nitro-2-methoxybenzamide hydrochloride. An excess of sodium bicarbonate (about 20 g.) was added and the mixture was stirred for an additional thirty minutes. The ethanol was removed by distilling in vacuo, the remaining mixture was cooled and the viscous, brown, gummy precipitate was taken up in ethyl acetate and the resulting ethyl acetate solution was dried over anhydrous potassium carbonate. Removal of the ethyl acetate yielded N-(3-diethylaminopropyl)-4-amino-2-methoxybenzamide as a brown, viscous oil.

This basic amide was converted into its phosphoric acid addition salt as follows: A solution of 7.0 g. of N-(3-diethylaminopropyl)-4-amino-2-methoxybenzamide in 25 cc. of ethanol was treated with a solution of 2.89 g. of 85% phosphoric acid in 25 cc. of ethanol. The precipitate was recrystallized several times, with charcoaling, from ethanol-water yielding N-(3-diethylaminopropyl) - 4 - amino - 2 - methoxybenzamide phosphate, M. P. 212.0–213.1° C. (cor.).

*Anal.*—Calcd. for $C_{15}H_{25}N_3O_2 \cdot H_3PO_4$: C, 47.73; H, 6.67. Found: C, 47.74; H, 6.83.

Additional N-(tertiary-aminoalkyl)-4-amino-2-alkoxybenzamides which can be prepared according to the above procedure using the appropriate N - (tertiary - aminoalkyl) - 4 - nitro - 2-alkoxybenzamide, in free base form or in the form of its hydrochloride addition salt, in place of N - (3 - diethylaminopropyl) - 4 - nitro - 2-methoxybenzamide hydrochloride, include the following: N - (2 - dimethylamino - 1 - propyl) - 4 - amino - 2 - methoxybenzamide; N - (2 - di - n - butylaminoethyl) - 4 - amino - 2 - methoxybenzamide; N - [3 - (1 - piperidyl)propyl] - 4-amino - 2 - ethoxybenzamide; N - [3 - (2 - methyl - 1 - piperidyl)propyl] - 4 - amino - 2 - methoxybenzamide; N - [2 - (2 - methyl - 1 - piperidyl)ethyl] - 4 - amino - 2 - ethoxybenzamide; N - [3 - (1 - pyrrolidyl)propyl] - 4 - amino - 2-ethoxybenzamide; N - [2 - (2,5 - dimethyl - 1 - pyrrolidyl)ethyl] - 4 - amino - 2 - methoxybenzamide; and N - [3 - (4 - morpholinyl)propyl]-4 - amino - 2 - ethoxybenzamide.

EXAMPLE 13

*N-(2-diethylaminoethyl)-4-amino-2-methoxybenzamide*

When the procedure described in Example 12 was followed but using 42.1 g. of powdered iron, 1 cc. of concentrated hydrochloric acid, 400 cc. of 50% aqueous ethanol and 41.6 g. of N-(2-diethylaminoethyl) - 4 - nitro - 2 - methoxybenzamide hydrochloride, there was obtained, as a viscous, amber oil, N - (2 - diethylaminoethyl) - 4-amino-2-methoxybenzamide.

The phosphate of this basic amide, obtained as above in Example 12, melted at 167.9–170.8° C. (cor.).

*Anal.*—Calcd. for $C_{14}H_{23}N_3O_2 \cdot H_3PO_4$: N, 11.56; $H_3PO_4$, 26.98. Found: N, 11.41; $H_3PO_4$, 27.35.

EXAMPLE 14

*N - [3 - (2 - methyl - 1 - piperidyl)propyl] - 4 - amino - 2 - methoxybenzamide*

When the procedure described above for Example 12 was followed but using 29 g. of powdered iron, 1 cc. of concentrated hydrochloric acid, 400 cc. of 50% aqueous ethanol and 32 g. of N - [3 - (2 - methyl - 1 - piperidyl) - propyl]- 4 - nitro - 2 - methoxybenzamide hydrochloride, there was obtained, as a red-orange, viscous oil, N - [3 - (2 - methyl - 1 - piperidyl)propyl] - 4 - amino - 2 - methoxybenzamide.

This basic amide was converted into its dihydrochloride addition salt as follows: Ten grams of the basic amide was dissolved in ethyl acetate and treated with an excess of ethanolic hydrogen chloride. The precipitated product was collected and recrystallized several times from absolute ethanol containing a small quantity of hydrogen chloride, yielding N - [3 - (2 - methyl - 1 - piperidyl)propyl] - 4 - amino - 2 - methoxybenzamide dihydrochloride monohydrate, M. P. 143.8–146.0° C. (cor.).

*Anal.*—Calcd. for $C_{17}H_{27}N_3O_2 \cdot 2HCl \cdot H_2O$: N, 10.60; Cl, 17.89; $H_2O$, 4.54. Found: N, 10.85; Cl, 17.61; $H_2O$, 4.54.

EXAMPLE 15

*N - (3 - diethylaminopropyl) - 4 - amino - 2 - ethoxybenzamide*

When the procedure described for Example 12 was followed but using 40.6 g. of powdered iron, 1 cc. of concentrated hydrochloric acid, 300 cc. of ethanol, 75 cc. of water and 39 g. of N-(3-diethylaminopropyl) - 4 - nitro - 2 - ethoxybenzamide, there was obtained, as an oily material which solidified on standing, N-(3-diethylaminopropyl)-4-amino-2-ethoxybenzamide.

This basic amide in the form of its monohydrochloride salt melted at 204–205.6° C. (cor.).

*Anal.*—Calcd. for $C_{16}H_{27}N_3O_2 \cdot HCl$: Cl, 10.75; N, 12.74. Found: Cl, 10.52; N, 12.75.

EXAMPLE 16

*N - (2 - diethylaminoethyl) - 4 - amino - 2 - n-butoxybenzamide*

When the procedure described above for Example 12 was followed but using 24.7 g. of powdered iron, 1 cc. of concentrated hydrochloric acid, 400 cc. of 50% aqueous ethanol and 24.8 g. of N - (2 - diethylaminoethyl) - 4 - nitro - 2 - n-butoxybenzamide hydrochloride, there was obtained, as an amber-colored oil, N - (2 - diethylaminoethyl) - 4 - amino - 2 - n - butoxybenzamide.

The monohydrochloride of this basic amide melted at 199.0–199.6° C. (cor.).

*Anal.*—Calcd. for $C_{17}H_{29}N_3O_2 \cdot HCl$: N, 12.22; Cl, 10.31. Found: N, 12.24; Cl, 10.39.

Additional N - (tertiary-aminoalkyl) - 4 - amino - 2 - alkoxybenzamides which can be prepared according to the foregoing procedure by substituting the appropriate N-(tertiary-aminoalkyl) - 4 - nitro - 2 - alkoxybenzamide, in the form of its free base or hydrochloride addition salt, for N - 2 - diethylaminoethyl - 4 - nitro - 2 - n - butoxybenzamide hydrochloride include the following: N - (2 - dimethylamino - 1 - propyl) - 4 - amino - 2 - n - amoxybenzamide; N- (2 - di - n - butylaminoethyl) - 4 - amino - 2 - n - propoxybenzamide; N - [3 - (1 - piperidyl)- propyl] - 4 - amino - 2 - n - butoxybenzamide; N - [2 - (2 - methyl - 1 - piperidyl)ethyl] - 4 - amino - 2 - n - hexoxybenzamide; N - [3 - (1-pyrrolidyl)propyl] - 4 - amino - 2 - isobutoxybenzamide; N - [2 - (2,5 - dimethyl - 1 - pyrrolidyl)ethyl] - 4 - amino - 2 - n - propoxybenzamide; and N - [3 - (4 - morpholinyl)propyl] - 4 - amino - 2 - n - butoxybenzamide.

EXAMPLE 17

*N - (2 - diethylaminoethyl) - 4 - amino - 2 - n-propoxybenzamide*

When the procedure described above for Example 12 was followed but using 28.0 g. of powdered iron, 1 cc. of concentrated hydrochloric acid, 400 cc. of 50% aqueous ethanol and 30.0 g. of N - (2 - diethylaminoethyl) - 4 - nitro - 2 - n-propoxybenzamide hydrochloride, there was obtained as a viscous, amber-colored oil, N - (2 - diethylaminoethyl) - 4 - amino - 2 - n - propoxybenzamide.

The hydrochloride of this basic amide melted at 232.7–233.7° C. (cor.).

*Anal.*—Calcd. for $C_{16}H_{27}N_3O_2 \cdot HCl$: N, 12.74; Cl, 10.75. Found: N, 12.72; Cl, 10.88.

EXAMPLE 18

*N-(2-diethylaminoethyl)-4-amino-2-n-propoxybenzamide methiodide*

A solution of 4.0 g. of N-(2-diethylaminoethyl)- 4-nitro-2-n-propoxybenzamide methiodide in 150 cc. of absolute ethanol was reduced catalytically with hydrogen in the presence of 200 mg. of platinum oxide, the reduction being carried out for a period of eight hours at 50° C. The reaction mixture was filtered and the filtrate was concentrated in vacuo to yield an orange, gummy material which was taken up in absolute ethanol. On cooling the ethanol solution, there separated crystalline material which was recrystallized, with charcoaling, from absolute ethanol-ether. A second recrystallization from absolute ethanol, with decolorization using charcoal, yielded N-(2-diethylaminoethyl) - 4 - amino - 2 - n - propoxybenzamide methiodide, M. P. 138.8–141.0° C. (cor.).

*Anal.*—Calcd. for $C_{16}H_{27}N_3O_2 \cdot CH_3I$: N, 965; I, 29.15. Found: N, 9.66; I, 28.99.

Additional N - (tertiary - amino) - 4 - amino- 2-alkoxybenzamide quaternary salts which can be prepared according to the above procedure by substituting the appropriate N-(tertiary-aminoalkyl) - 4 - nitro - 2 - alkoxybenzamide quaternary salt for N-(2-diethylaminoethyl)-4-nitro-2- n-propoxybenzamide methiodide include the following: N-(2-dimethylamino-1-propyl)-4-amino- 2-n-amoxybenzamide methiodide; N-(2-di-n-butylaminoethyl) - 4 - amino - 2 - n - propoxybenzamide methobromide; N - [3 - (1 - piperidyl)propyl] - 4 - amino - 2 - n - butoxybenzamide ethiodide; N - [2 - (2 - methyl - 1 - piperidyl)- ethyl] - 4 - amino - 2 - n - hexoxybenzamide benzobromide; N - [3 - (1 - pyrrolidyl) propyl]- 4 - amino - 2 - isobutoxybenzamide methosulfate; N - [2 - (2,5 - dimethyl - 1 - pyrrolidyl)ethyl]- 4 - amino - 2 - methoxybenzamide methobenzenesulfonate; and N - [3 - (4 - morpholinyl)propyl] - 4 - amino - 2 - ethoxybenzamide methop - toluenesulfonate.

Similarly, following the foregoing procedure but using the related N-(tertiary-aminoalkyl) - 4 - nitro - 2 - hydroxybenzamide quaternary salts, as described in Example 9, in place of N - (2 - diethylaminoethyl) - 4 - nitro - 2 - n propoxybenzamide methiodide, the N-(tertiary-aminoalkyl) - 4 - amino - 2 - hydroxybenzamide quaternary salts are formed, for example, N-(2-diethylaminoethyl) - 4 - amino - 2 - hydroxybenzamide methiodide, N - (2 - di - n - butylaminoethyl) - 4 - amino - 2 - hydroxybenzamide ethobromide, N - [2 - (2 - methyl - 1 - piperidyl)-ethyl] - 4 - amino - 2 - hydroxybenzamide benzochloride, N - [3 - (4 - morpholinyl) propyl]-4 - amino - 2 - hydroxybenzamide methosulfate and N - [2 - (2,5 - dimethyl - 1 - pyrrolidyl)-ethyl] - 4 - amino - 2 - hydroxybenzamide metho-p-toluenesulfonate.

EXAMPLE 19

*N - (2 - diethylaminoethyl) - 4 - amino - 2 - n-butoxybenzamide methiodide*

When the procedure described above for Example 18 was followed but substituting 4.5 g. of N - (2 - diethylaminoethyl) - 4 - nitro - 2 - n-butoxybenzamide methiodide for the 2-n-propoxy homolog and carrying out the hydrogenation for four hours at 50° C., there was obtained N-(2-diethylaminoethyl) - 4 - amino - 2 - n - butoxybenzamide methiodide, M. P. 173.3–174.5° C. (cor.).

*Anal.*—Calcd. for $C_{17}H_{29}N_3O_2 \cdot CH_3I$: N, 9.35; C, 48.11; H, 7.17. Found: N, 9.28; C, 48.02; H, 6.97.

EXAMPLE 20

*N - (3 - diethylaminopropyl) - 4 - n - butylamino-2 - methoxybenzamide*

To a hot stirred mixture of 8.0 g. of N-(3-diethylaminopropyl) - 4 - amino - 2 - methoxybenzamide, 7.49 g. of zinc dust, 7.04 g. of glacial acetic acid and 100 cc. of dry benzene was added 2.50 g. of n-butyraldehyde dissolved in 25 cc. of dry benzene over a period of about fifteen minutes. After the mixture had been stirred under reflux for one and one-half hours, an additional 1 cc. of n-butyraldehyde was added and refluxing, with stirring, was continued for an additional three and one-half hours. The zinc and zinc acetate was filtered off and washed with hot dilute acetic acid and benzene. The cooled filtrate was made basic to litmus with concentrated ammonium hydroxide, the benzene layer was separated and the aqueous layer was extracted with benzene. The benzene extracts were combined with the benzene layer and the resulting benzene solution was dried over anhydrous potassium carbonate. Removal of the benzene by distilling in vacuo yielded N-(3-diethylaminopropyl) - 4 - n - butylamino - 2-methoxybenzamide as a straw-colored oily material.

This basic amide was purified by converting it into its hydrochloride salt, dissolving the hydrochloride in absolute ether, treating the hot ether solution with decolorizing charcoal, filtering the hot mixture and removing the ether by distilling in vacuo. The hydrochloride was then dissolved in water, the aqueous solution was made basic to litmus with concentrated ammonium hydroxide and the basic amide that separated was taken up in n-hexane. On cooling, this solution yielded an oily product which crystallized on standing. This solid was filtered and recrystallized from benzene - n - hexane, yielding N - (3 - diethylaminopropyl) - 4 - n - butylamino - 2 -methoxybenzamide, M. P. 58.4–59.8° C. (cor.).

*Anal.*—Calcd. for $C_{19}H_{33}N_3O_2$: C, 68.02; H, 9.91; N, 12.53. Found: C, 68.08; H, 9.79; N, 12.33.

Additional N - (tertiary - aminoalkyl) - 4-alkylamino - 2 - alkoxybenzamides which can be prepared according to the above procedure by substituting the appropriate N-(tertiary-aminoalkyl) - 4 - amino - 2 - alkoxybenzamide and alkanal for N - (3 - diethylaminopropyl) - 4-amino - 2 -methoxybenzamide and n - butyraldehyde, respectively, include the following: N - (2-n - butylaminoethyl) - 4 - n - propylamino - 2-methoxybenzamide; N - [3 - (2 - methyl - 1-piperidyl) propyl] - 4 - n - hexylamino - 2-methoxybenzamide; N - [3 - (1 - pyrrolidyl)-propyl] - 4 - n - butylamino - 2 - ethoxybenzamide; N - (2 - dimethylamino - 1 - propyl) - 4-n - amylamino - 2 - n - amoxybenzamide; and N - [3 - (4 - morpholinyl) propyl] - 4 - n - butylamino - 2 - n - butoxybenzamide.

Alternatively, the foregoing procedure can be carried out using direct alkylating means. For example, by alkylating N - (2 - diethylaminoethyl) - 4 - amino - 2 - n - butoxybenzamide with methyl iodide or ethyl bromide, there is obtained, respectively, N - (2 - diethylaminoethyl) - 4 - methylamino - 2 - n - butoxybenzamide and N - (2 - diethylaminoethyl) - 4-ethylamino - 2 - n - butoxybenzamide.

When the above procedure for Example 20 is followed but using N - (2 - diethylaminoethyl)-4 - amino - 2 - n - propoxybenzamide methiodide in place of N - (3 - diethylaminopropyl) - 4-amino - 2 - methoxybenzamide, there is obtained N - (2 - diethylaminoethyl) - 4 - n - butylamino-2 - n - propoxybenzamide methiodide.

Following the procedure above for Example 20 but using N - (2 - diethylaminoethyl) - 4 - amino-2 - hydroxybenzamide or its methiodide in place of N - (3 - diethylaminopropyl) - 4 - amino - 2-methoxybenzamide, there is obtained N - (2 - diethylaminoethyl) - 4 - n - butylamino - 2 - hydroxybenzamide or its methiodide, respectively.

EXAMPLE 21

*N - (4 - diethylaminobutyl) - 4 - n - butylamino-2-methoxybenzamide*

When the procedure described above in Example 20 was followed but using 20.0 g. of N-(4-diethylaminobutyl) - 4 - amino - 2 - methoxybenzamide, 17.85 g. of zinc dust, 16.8 g. of glacial acetic acid, 5.94 g. of n-butyraldehyde and 300 cc. of dry benzene, there was obtained the corresponding 4-n-butylamino basic amide, which was purified as in Example 20 through its hydrochloride salt. The product thus obtained, N-(4-diethylaminobutyl) - 4 - n - butylamino - 2-methoxybenzamide, was an amber-colored, viscous oil.

*Anal.*—Calcd. for $C_{20}H_{35}N_3O_2$: C, 68.73; H, 10.09; N, 12.02. Found: C, 68.63; H, 10.26; N, 12.00.

EXAMPLE 22

*N - [3 - (2 - methyl - 1 - piperidyl) propyl] - 4 - n-butylamino-2-methoxybenzamide*

When the procedure described above for Example 20 was followed using 15.0 g. of N-[3-(2-methyl - 1 - piperidyl) propyl] - 4 - amino - 2-methoxybenzamide, 4.29 g. of n-butyraldehyde, 12.85 g. of zinc dust, 12.1 g. of glacial acetic acid and 300 cc. of dry benzene, there was obtained, after purification through its hydrochloride salt, N - [3 - (2 - methyl - 1 - piperidyl) propyl] - 4 - n-butylamino - 2 - methoxybenzamide, a viscous, straw-colored oil.

*Anal.*—Calcd. for $C_{21}H_{35}N_3O_2$: C, 69.76; H, 9.75; N, 11.62. Found: C, 69.93; H, 9.58; N, 11.31.

EXAMPLE 23

N - (3 - diethylaminopropyl) - 4 - n - amylamino-2-methoxybenzamide

When the procedure described above for Example 20 was followed but using 8.0 g. of N-(3-diethylaminopropyl) - 4 - amino - 2 - methoxybenzamide, 2.94 g. of n-valeraldehyde, 7.94 g. of zinc dust, 7.04 g. of glacial acetic acid and 150 cc. of dry benzene, there was obtained N-(3-diethylaminopropyl) - 4 - n - amylamino - 2 - methoxybenzamide, as a brown viscous oil.

We claim:

1. A member of the group consisting of an N - (tertiary - aminoalkyl) - 2,4 - disubstituted-benzamide having the formula

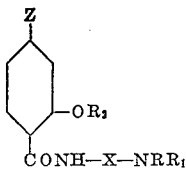

where Z is a member of the group consisting of $NH_2$ and NH(lower alkyl), $R_2$ is a member of the group consisting of H and lower alkyl radicals, X is a lower alkylene radical having at least two carbon atoms and having its two free valence bonds on different carbon atoms, and $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, and its non-toxic acid addition and quaternary ammonium salts.

2. An N - (dialkylaminoalkyl) - 4 - amino - 2-alkoxybenzamide having the formula

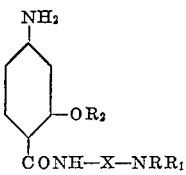

where X is a lower alkylene radical having at least two carbon atoms and having its two free valence bonds on different carbon atoms, and R, $R_1$ and $R_2$ are each lower alkyl radicals.

3. An N - (tertiary-aminoalkyl) - 4 - amino-2-alkoxybenzamide having the formula

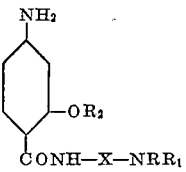

where X is a lower alkylene radical having at least two carbon atoms and having its two free valence bonds on different carbon atoms, $R_2$ is a lower alkyl radical and $NRR_1$ is a (lower alkylated)-1-piperidyl radical.

4. A compound according to claim 2 where —X—$NRR_1$ is a 2-diethylaminoethyl radical.

5. A process of preparing an N-(tertiary-aminoalkyl)-4-amino-2-substituted-benzamide having the formula

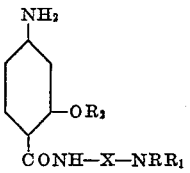

where $R_2$ is a member of the group consisting of H and lower alkyl radicals, X is a lower alkylene radical having at least two carbon atoms and having its two free valence bonds on different carbon atoms, and $NRR_1$ is a member of the group consisting of lower dialkylamino, 1-piperidyl, (lower alkylated) - 1 - piperidyl, 1 - pyrrolidyl, (lower alkylated)-1-pyrrolidyl and 4-morpholinyl, which comprises treating the corresponding N - (tertiary - aminoalkyl) - 4 - nitro - 2-substituted-benzamide with a reducing agent effective to reduce nitro groups to amino groups.

6. A process of preparing an N-(dialkylaminoalkyl)-4-amino-2-alkoxybenzamide having the formula

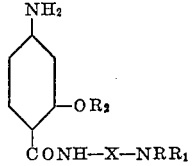

where R, $R_1$ and $R_2$ are each lower alkyl radicals and X is a lower alkylene radical having at least two carbon atoms and having its two free valence bonds on different carbon atoms, which comprises treating the corresponding N - (dialkylaminoalkyl)-4-nitro-2-alkoxybenzamide with a reducing agent effective to reduce nitro groups to amino groups.

7. A process of preparing an N-(tertiary-aminoalkyl)-4-amino-2-alkoxybenzamide having the formula

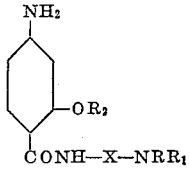

where $R_2$ is a lower alkyl radical having at least two carbon atoms and having its two free valence bonds on different carbon atoms, X is a lower alkylene radical and $NRR_1$ is a 1-piperidyl radical, which comprises treating the corresponding N - (tertiary - aminoalkyl) - 4 - nitro - 2 - alkoxybenzamide with a reducing agent effective to reduce nitro groups to amino groups.

8. A process according to claim 6 where —X—$NRR_1$ is —$CH_2CH_2N(C_2H_5)_2$.

9. N - (2 - diethylaminoethyl) - 4 - amino-2-n-propoxybenzamide.

10. N - (2 - diethylaminoethyl) - 4 - amino-2-n-butoxybenzamide.

11. A process of preparing N-(2-diethylaminoethyl) - 4 - amino - 2 - n - propoxybenzamide which comprises treating N - (2 - diethylaminoethyl) - 4 - nitro - 2 - n - propoxybenzamide with a reducing agent effective to reduce nitro groups to amino groups.

12. A process of preparing N - (2 - diethylaminoethyl) - 4 - amino - 2 - n - butoxybenzamide which comprises treating N - (2 - diethylaminoethyl) - 4 - nitro - 2 - n - butoxybenzamide with a reducing agent effective to reduce nitro groups to amino groups.

13. An N - (dialkylaminoalkyl - 4 - amino-2-hydroxybenzamide having the formula

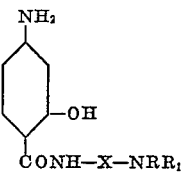

where X is a lower alkylene radical having at least two carbon atoms and having its two free valence bonds on different carbon atoms, and R and R₁ are each lower alkyl radicals.

14. A compound according to claim 13 where NRR₁ is a diethylamino radical.

15. N - (3 - diethylaminopropyl) - 4 - amino - 2 - hydroxybenzamide.

16. An N - (dialkylaminoalkyl) - 4 - alkylamino - 2 - alkoxybenzamide having the formula

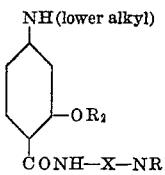

where X is a lower alkylene radical having at least two carbon atoms and having its two free valence bonds on different carbon atoms, and R, R₁ and R₂ are each lower alkyl radicals.

17. An N - (diethylaminoalkyl) - 4 - n - butylamino - 2 - alkoxybenzamide having the formula

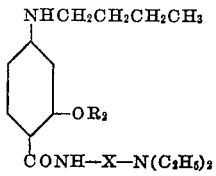

where X is a lower alkylene radical having at least two carbon atoms and having its two free valence bonds on different carbon atoms and R₂ is a lower alkyl radical.

18. N - (3 - diethylaminopropyl) - 4 - n - butylamino-2-methoxylbenzamide.

19. N - [3 - (2 - methyl - 1 - piperidyl) propyl] - 4-amino-2-methoxybenzamide.

References Cited in the file of this patent

UNITED STATES PATENTS

| Number | Name | Date |
|---|---|---|
| 2,073,100 | Eisleb | Mar. 9, 1937 |
| 2,490,780 | Clinton et al. | Dec. 13, 1949 |
| 2,551,647 | Steiger | May 8, 1951 |

OTHER REFERENCES

Chemical Abstracts, vol 44 (1950) p. 10138. (Abstract of McIntyre et al.—"Nebraska State Med. J." vol. 35 (1950) pp. 100 to 104.

Jensen et al.: "Acta Chemica Scand." vol. 2 (1948) pp 220 to 224.

Bing et al.: "Acta Pharmacol." vol. 4 (1948) pp. 199 to 204.